United States Patent

Stich et al.

[11] Patent Number: 4,697,127
[45] Date of Patent: Sep. 29, 1987

[54] ADAPTIVE CONTROL TECHNIQUE FOR A DYNAMIC SYSTEM

[75] Inventors: Michael C. Stich; John B. Resman; Hjalmar H. Ottesen; Todd B. Anderson, all of Rochester, Minn.

[73] Assignee: International Business Machines Corporation, Armonk, N.Y.

[21] Appl. No.: 871,949

[22] Filed: Jun. 9, 1986

[51] Int. Cl.[4] .................. G05B 13/00; G11B 21/08
[52] U.S. Cl. .................................. 318/561; 360/78
[58] Field of Search ............... 318/561, 632, 615, 616, 318/617, 618, 619, 620, 621, 622, 567, 636; 360/75, 77, 78; 364/170, 176, 148, 149, 150, 151, 157

[56] References Cited

U.S. PATENT DOCUMENTS

| | | | |
|---|---|---|---|
| 3,622,767 | 11/1971 | Koepeke | 318/561 |
| 3,883,894 | 5/1975 | Johnson | 360/78 |
| 4,133,011 | 1/1979 | Kurzweil | 318/561 |
| 4,263,627 | 4/1981 | Rose | 318/561 |
| 4,314,291 | 2/1982 | Oda | 360/78 |
| 4,349,868 | 9/1982 | Brown | 318/561 |
| 4,498,036 | 2/1985 | Salemka | 318/561 |
| 4,609,855 | 9/1986 | Andrews | 318/561 |

Primary Examiner—Bernard Roskoski
Assistant Examiner—Patrick C. Keane
Attorney, Agent, or Firm—Robert W. Lahtinen

[57] ABSTRACT

A controller for a voice coil motor driven disk file actuator is described. The device has an online adjustable gain characteristic for controlling movement of the actuator assembly and an estimator that estimates actuator velocity and bias. Forward gain is estimated from position and coil current measurements and compared with a nominal value to create an error signal used to adjust the controller and estimator gain characteristics. The control technique allows changes in the open loop system without changing the closed loop performance. By monitoring loop gain it is possible to alter compensator gains to maintain a constant closed loop performance.

12 Claims, 3 Drawing Figures

ADAPTIVE CONTROL TECHNIQUE FOR A DYNAMIC SYSTEM

TECHNICAL FIELD

The invention pertains to adaptive control, and more particularly to allowing changes in an open loop system without changing closed loop performance, in a substantially frictionless system.

BACKGROUND OF THE INVENTION

The invention is shown and described with respect to a magnetic hard disk data storage file, but is adaptable to the control of most dynamic systems. A dynamic system is subject to variations based upon manufacturing tolerances of the device, its assemblies and components. The system is subject to change in operation as a result of environmental conditions such as temperature and humidity and operating conditions such as position within the cycle of operation. Finally, the system is subject to variations induced by wear and age.

Compensation can be made for manufacturing tolerances and component differences by factory tuning or adjustment. However, this is only partially effective, since many factors such as operating and environmental conditions cannot be accommodated by such procedures. In addition, age and wear can be a factor by imparting an early change in the life of the product as the system is altered by early operation or run in.

The environment in which the invention is shown and described is a voice coil motor driven actuator for a rigid magnetic disk data storage device. These devices require great precision to meet specification requiring more than 1000 tracks per inch and information bit densities exceeding 12,000 bits per inch. This can not be accomplished by designing to worst case mechanical and electrical component tolerances, operating environments and wear to be experienced during product life.

The actuator that carries the magnetic transducers is an electro-mechanical system with numerous components that are subject to variation. The heads have parameters such as core width and gap length. There is a demodulator gain and an actuator mechanical force constant. There are analog to digital and digital to analog gains and actuator predriver and power driver gains. The mass variation between apparently identical actuators, the sampling period and the track pitch must be accommodated. All of these parameters are subject to change as a result of factors including temperature, humidity, wear and initial tolerances.

One option available for over coming these problems is to limit the performance standard to that of the least capable device that marginally attains the standard of acceptability. Another is to raise the level of all devices by holding rigorous tolerances with a corresponding high component rejection rate and increased cost.

SUMMARY OF THE INVENTION

The adaptive control system of this invention is applicable to frictionless systems. Although no device or system is truly friction free, the term frictionless as used herein refers to a system wherein the friction is such a small percentage factor in the force used to drive the device (a disk drive actuator carriage in the illustrated embodiment) that it can be ignored as an element of performance. Thus, friction is a small error position of the forward gain factor.

In essence, the control technique allows changes in the open loop system without changing the closed loop performance. By monitoring the loop gain it is possible to alter compensator gains to maintain a constant closed loop performance.

In the present invention, the forward gain of the overall dynamic system is measured and compared to a nominal value, providing a difference or error signal that enables system controller/estimator adjustments on a continuing basis. This not only overcomes the variations of components at the time of manufacture and assembly, but also compensates for environmental changes in temperature and humidity and variations that occur with time involving age and wear. Accordingly, each drive to which the system is applied operates at the optimum level of performance which the composite of the factors affecting the forward gain of the system permit.

It is an object of the invention to provide an adaptive control for a dynamic system that provides optimum performance during the life of the device.

It is a further object of this invention to provide a control system that enables uniform performance and limited performance variation from device to device of the same design.

It is also an object of this invention to provide a dynamic device control system that has less stringent component tolerance requirements to reduce device costs.

It is an object to provide a control technique for a dynamic system wherein field servicing for performance tuning is not required.

It is a further object of the invention to provide a control of a dynamic system wherein performance is independent of parameter changes affecting forward gain.

It is an object of the invention to provide a dynamic system control wherein the tracking of changes in forward gain with time yields diagnostic information for anticipating potential system problems.

It is an object of the invention to provide a dynamic system control for a magnetic disk drive actuator that generates an individualized forward gain value for each transducer head of the assembly.

In order to optimize performance of a direct access magnetic disk drive device (i.e., minimize seek and settling time), it is necessary to know the actuator electro-mechanical parameters as exactly as possible at any period in time. A disk device can be tuned for best performance at the time of manufacture, but will become rapidly detuned with time as wear occurs and temperature and humidity changes. It is, therefore, important for the system to monitor parameter changes and update the controller to maintain actuator dynamics at peak (optimal) performance.

This invention teaches a simple and effective implementation of a self tuning (adaptive) actuator controller. Physical measurements on rigid magnetic disk drive hardware shows that parameter estimation accuracies within + or −4%.

There are many ways to measure the forward gain parameter of a mechanical system. The method of this invention features a simple measurement technique ideally suited for implementation using a microprocessor. The result yields good accuracy and repeatability, requires no added external signals to the system and includes the combined effects of the entire electro-mechanical system. The forward gain of a discrete magnetic disk drive actuator system is comprised of many components including:

1. Head parameters like core width and gap length,

2. Demodulator gain,
3. Actuator mechanical force constant,
4. Analog to digital and digital to analog gains,
5. Actuator predriver and power driver gains,
6. Actuator mass,
7. Sampling period (sector time), and
8. Track pitch.

All of these parameters are more or less subject to changes with temperature, humidity, initial tolerances etc; for example, accessing with different heads will yield different gain constants.

The forward gain estimate of the disk drive actuator electro-mechanical system can be performed at any time in the field with only a short pause for a seek operation, typically less than 50 ms. The method involves the use of the "second difference" applied to the linear portion (i.e., the nonsaturated power driver region of a medium length seek) starting from the discrete time equations of linear motion normalized with respect to track pitch and sampling period (assuming no friction).

Since it is possible to calculate the forward gain in terms of successive measurements of position error signal (PES) and successive control commands derived by the microprocessor, the forward gain factors are easy to estimate. It is important to note that exact estimates of forward gain can be obtained neither while the file is track following, nor at the start of the acceleration phase in the seek mode which is open loop. The measurements are taken during the portion of the acceleration when the actuator exhibits its most linear characteristics and is still in an open loop mode. This time is just before the constant velocity or deceleration mode, which are closed loop, has been reached.

Once the forward gain has been estimated, the controller gains, estimator equations and seek profile table can be updated to optimize operating conditions. This will yield best performance, unaffected by parameter changes. The updating of such controller gains may be done by calculations or a simple gain scheduling through a table lookup function.

DETAILED DESCRIPTION

Figure 1:
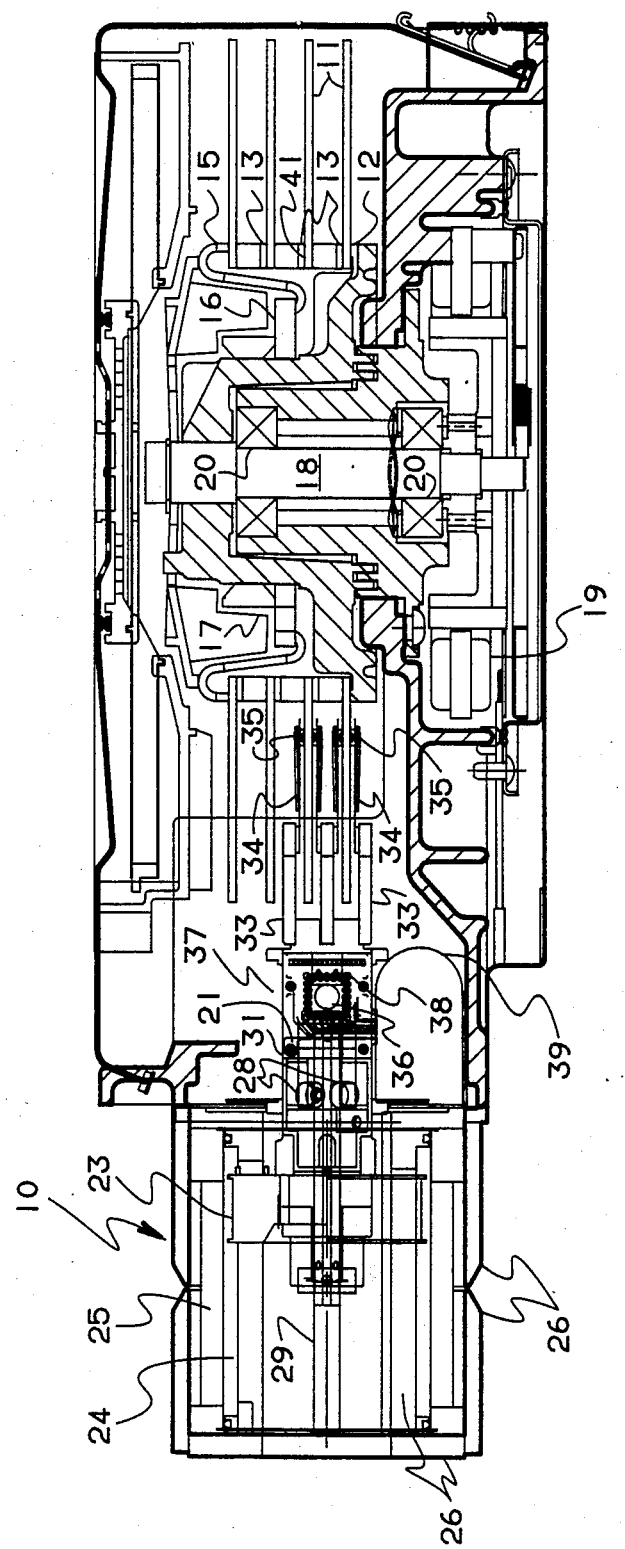
FIG. 1 illustrates a typical disk drive, partly broken away and partly in section, that shows a linear actuator that carries and positions the transducers.

The following analysis describes the servo control system for a digitally controlled disk file actuator. Its function is to control the position of the read/write head of the file. It is an entirely digital system except for the power driver circuitry and the head signal electronics. The system is able to compensate for environmental changes and is free from component tolerances and drift problems normally associated with analog loops.

The system details will be described first, with its two basic modes of operation, track follow and seeking. Track follow holds the transducer head over a desired track and seeking moves the head to the desired track. Velocity is not measured, but is calculated with an estimator. The description of the actuator will also be covered. Then parameters of the system will be described and how the system automatically adapts to changes. Finally, truncation analysis will be described, showing how effects of finite digital word length affect the system.

The control technique must start with that which is to be controlled. In the present example, the actuator is modeled as a double integrator in the continuous time domain. The control system is a sector servo system, so the description is converted to the discrete time domain.

The state space description in discrete time wherein k is the current sector and k+1 is the next subsequent sector is:

$$x1(k + 1) = x1(k) + x2(k) + (G1)x3(k) + (G1)u(k) \quad (1)$$

$$x2(k + 1) = x2(k) + (G2)x3(k) + (G2)u(k) \quad (2)$$

$$x3(k + 1) = x3(k) \quad (3)$$

Note that the state variables x1, x2, and x3 have been normalized in this description. The units are as follows:
x1—position—tracks
x2—velocity—tracks/sector
x3—bias force—volts (equivalent predriver/driver input)
u—acceleration—volts (input to the actuator predriver/driver)

In this system, u is directly proportional to coil current I. This is because the driver system is a current driver, except of course when it saturates. This happens when the current makes very large changes and the rise time of the coil comes into play. Typically, this only at the beginning and the middle of the seek. The above set of units has the advantage of eliminating the multiplication of x2 in the equations (1) by the sample period or sector time T. This parameter (T), along with all others in the system, has been incorporated into G1 and G2. It also turns out that 2 G1=G2 in this set of units. This simplification is important for the ease of adapting the system to parameter changes. G2, Therefore, is:

$$gm \, (Kf) \, T^2 \, Tpm/m$$

The parameters are defined as follows :
gm—predriver/driver transconductance—Amps/Volt
Kf—actuator force constant—Nt/Amp
T—sector time—Seconds
Tpm—track pitch—tracks/meter
m—actuator moving mass—Kg Note that an implied parameter is the demodulator gain in volts/track. This has been left off since in the present device it is always unity.

The only measurement of the above system that the servo system obtains is the position error signal (PES), which is essentially equivalent to x1 above, However, for effective control, the system needs at least the velocity, x2 as well. Therefore, to derive this, an estimator was constructed which uses the measured x1, the u that is calculated by the processor, and the knowledge of the description of the system. It is a "reduced order" estimator in the sense that x1 could also be estimated and thereby eliminate some of the noise associated with that measurement. The measurement is good enough not to require this, so a reduced order estimator of only velocity and bias is used.

In this discussion, the present sector will be designated the sector k+1.

The equations for the estimator are as follows:

$$x2(k + 1|k + 1) = x2(k|k) + (G2)x3(k|k) + \quad (4)$$

$$G2u(k) + L2[x1(k + 1) - x1(k) -$$

$$(G1)x3(k|k) - x2(k|k) - (G1)u(k)]$$

$$x3(k + 1|k + 1) = x3(k|k) + L3[x1(k + 1) - \quad (5)$$

$$x1(k) - (G1)u(k) - (G1)x3(k|k) - x2(k|k)]$$

These variables can be interpreted as follows:

$x2(k+1|k+1)$—is the estimated velocity for the present sector based on information available this sector [i.e., the $PES(k+1)$].

$x3(k+1|k+1)$—is the bias force estimate for the present sector.

L2,L3—are the filter coefficients. They determine the filtering properties of the estimator and how fast its response is.

Thus the variable $x2(k+1|k+1)$ is used in place of $x2(k+1)$ in all of the control equations inside the processor since $x2(k+1)$ is not measured from the actuator directly. The state $x3(k+1|k+1)$ is used inside the estimator only to eliminate the bias in $x2(k+1|k+1)$ that would result if it was not there. There is a statement in control theory called the "Separation Principle" that says that you can design an estimator and a control law independently, and it will work as assumed when they are combined. This means that the above estimator can be designed independently of the design for the control described below. In actual practice, the above equations are combined with the control equations and rearranged so that there is only one multiply and one add between the measurement of the PES and the output of the coil current. This is important to keep the phase margin of the system up and to keep the settles smooth.

The purpose of the track follow mode is to hold the head over a given track in the presence of disturbances such as constant bias forces, external vibrations, spindle runout due to imbalance and noise on the measurement signal. It does this by weighing three states (in the sense of state space control) and then adding them together to produce the coil current. The selection of the weights determines the properties of the loop. The three states are defined as:

| | | |
|---|---|---|
| x1(k + 1) | position | this is essentially PES(k + 1) |
| x2(k + 1\|k + 1) | velocity | calculated by estimator |
| x4(k + 1) | integrated position | |

The equation for calculating the integrated position is:

$$x4(k+1) = x4(k) + x1(k) \quad (6)$$

Thus x4 is just the running sum of position x1 so that any average offset in x1 will eventually be forced to zero. How fast that happens is determined by the weighting on the state x4.

Thus the equation for the coil current during track follow is:

$$u(k) = -(K1)x1(k) - (K2)x2(k|k) - (K4)x4(k) \quad (7)$$

The selection of K1, K2 and K4 are determined by pole placement methods and by the frequency response criteria. Formula and computational methods for determining the Ks given the desired system poles can be found in texts such as Franklin and Powell, *Digital Control of Dynamic Systems,* (Addison-Wesley Publishing Company, 1980).

The purpose of the seek mode is to move the head from one track to another in the quickest possible manner. This includes many considerations such as head settling time, coil current rise time, and resonance excitation. The seek mode is designed to follow a "profile". This is a table of values in the microprocessor that represents a desired velocity at a given distance from the target track. The estimated velocity is then subtracted from the profile velocity and multiplied by a constant to get the desired coil current. Thus, in the seek mode, the equation for coil current is:

$$u(k) = +Kv[Profile(x1(k)) - x2(k|k)] - (k4)x4(k) \quad (8)$$

Note that the profile is actually accessed with the distance remaining to the target track, but this is essentially x1(k) modulo, an additive constant. The first term in (8) calculates the current necessary to follow the profile and the second adds in a constant to cancel the expected bias. The comments on bias handling include an explanation for the last term in equation (8). The constant Kv is the gain and is set equal to K2 from the track follow mode to minimize transient motion during the settle.

When the head is very far from the target track, u(k) is calculated to be a very big number which is limited to the saturation value of the drive system. Thus the actuator accelerates as fast as it can. Once the position/velocity combination reaches the profile, the system goes into a linear mode and follows the profile down to the target track. Many of the properties of the seek can be controlled through the design of the profile. The first step is to determine what current is desired in the coil while it is decelerating down the profile. This current is then integrated twice (in a numerical simulation program) to get position and velocity, which are then made into the profile table. This way a profile can be generated numerically for any arbitrary current waveform. This current must take into account the following factors:

Vps: power supply voltage
Rcoil: coil resistance
Vce: driver saturation voltage
Re: emitter sense resistors
Kf: force constant The equation for the nominal current is:

$$Icoil = \frac{Vps - 2(Vce) + Kf(\text{Velocity})}{Rcoil + 2Re} \quad (9)$$

This is reduced by the amount necessary to overcome bias. Thus the actuator will get the amount of current necessary to do the seek and also cancel the bias forces if they are opposing the seek direction. It is a good idea to further decrease the current for the last few sectors at the end of the seek so that the current does not have to switch off instantaneously from a large value, something the coil inductance will not let it do. This has the added advantage of reducing the excitation of resonances at the end of the seek since there is less jerk.

The profile is designed so that it will hand off the actuator to the track follow mode with a minimum of transient motion. This means designing the profile to hand off along the track follow modes eigenvector.

Thus the actuator should follow this eigenvector right down to the track. This hand off occurs, in the system described, at .15 tracks from the center line of the target track.

Another factor that must be considered in the profile is the problem of overshoot in short seeks. The actuator overshoots the profile when it is accelerating due mostly to computation delay, switching delays and coil current rise times. On a long seek, this is not a problem since there is sufficient time to recover. On a short seek, though, it can cause a significant amount of overshoot of the target track. One way to deal with this is to anticipate the profile and, knowing the delay involved, switch the current ahead of time. This, however, requires extra microprocessor computation time during the seek and the amount of anticipation tends to be dependent on the seek length. If you overcorrect, the actuator can undershoot badly. One way around this is to reduce the current during the last 2-4 ms of the seek when designing the profile. This allows extra headroom in that area, letting the short seeks recover much faster. It does increase the seek time slightly for longer seeks, but tests show the amount of increase to be very small. The size and length of the current reduction is designed by trial and the use of a simulation program. Knowing what lengths of seek have overshoot problems and their deceleration current times provides a starting point. A major advantage of this method is that it is free in terms of processor time.

After the profile is generated, it is translated into a table with variable position resolution suitable for loading into the processor. The object is that good resolution is not required in the table when the actuator is far from the target track, but very good resolution is required near the end of the seek. This allows a reduction of the memory space required to store the profile from approximately 8000 words to about 300. The result is that the resolution in the table near the target track is 1/32 of a track, but at a position with 500 tracks to go, the resolution is 8 tracks. The resolution varies in steps as the target track is approached.

There are several sources of constant forces on the actuator. They are lumped under the term "bias" and are any force that does not vary with time. They may, however, vary with the radial position of the head. Typical forces include the radial component of the wind caused by the disks, tilt of the file, biases in flexible cables to the actuator and electrical offsets in the driver circuitry. As mentioned previously, during track follow these biases are measured in the estimator and cancelled by the integrated position x4 in the controller. Since they vary with radius though, it is necessary to do a special initialization when a seek is performed.

The disk is broken up into 43 equal bands of 32 tracks and the bias in each band is remembered so that it can be quickly initialized when a seek to that band is performed. Initially, all bands are set to zero. The first seek to a given band may not settle very quickly if the bias forces are much different from zero. When the actuator leaves a given band, the value of x4 is stored in the memory for that band. The estimator bias x3 runs all the time, so it is not necessary to save it, but during a seek, integrated position x4 is not meaningful a long way from the target track. Thus it does not integrate during the seek. It is initialized from the saved value for the target band at the beginning of the seek and added as a constant to the seek coil current to cancel the bias until the head has settled sufficiently to turn the integrating action back on.

The scaling of the numbers used in the control system is important to ensure that the errors generated in using fixed point arithmetic in the processor do not get too large. The demodulator, used in the described embodiment, generates the PES as an 11-bit number. The first 2 bits are whole track numbers and the 9 least significant bits are the fractional part of a track. Internal to the processor, all numbers are 16 bits long and treated as if the fractional part was 10 bits long, and the whole part is 6 bits, including the sign bit. There are two areas where special scaling takes place to minimize errors:

1. The driver circuitry is switched between high and low gain to maximize the resolution. High gain is used in seek modes when large currents may be necessary. Low gain is used in track follow when resolution is important. In both cases a constant is used to normalize the gain. Since the driver is only 8 bits and the processor is 16, the normalization does not defeat the purpose of the scaling.

2. Two of the variables in the estimator are scaled up during track follow by a factor of 16. They are the velocity $x2(k|k)$ and the estimated bias, $x3(k|k)$. These two variables get so small during track follow that truncation of them in the various computations adversely affected the performance. The bias is not used externally so it does not have to be rescaled. The velocity is rescaled by simply dividing K2 by 16 so that the overall effect of the velocity on the coil current is correct.

In order to improve the performance of the system, the estimator and controller equations are rearranged and combined to minimize the delay between the sample time and the output of the coil current. Both seek and track follow can be rearranged in the same manner.

Following are three equations found in chapter 6 of Franklin and Powell (supra):

1. $x(k+1|k) = Fx(k|k) + Gu(k)$     6.38a

2. $x(k+1|k+1) = x(k+1|k) + L[y(k+1) - Hx(k+1|k)]$     6.38b

3. $u(k+1) = -Kx(k+1|k+1)$     6.55

Substituting equation (1) into equation (2) yields:

4. $x(k+1|k+1) = [F - LHF]x(k|k) + [G - LHG]u(K) + Ly(k+1)$

Further substitution of equation (4) into equation (3) gives:

5. $u(k+1) = -K\{[F - LHF]x(k|k)\} - K\{[G - LHG]u(k)\} - KLy(k+1)$

Redefining equation (5) gives results as follows:

6. $u(k+1) = \text{Cadd} + \text{Cmult } y(k+1)$

7. $\text{Cadd} = -K\{[F - LHF]x(k|k)\} - K\{[G - LHG]u(k)\}$

8. $\text{Cmult} = -KL$

The impact of the preceding is that the rearranging of the equations for a "current" estimator allows the output of the estimator-controller to be done quicker with respect to the input of signal y. Cadd does not have to be computed in between the input of signal y and the output of signal u. It can be computed prior to the input of signal y. Cmult can also be computed prior to the input of signal y. This means that the output is generated by inputting signal y, multiplying by Cmult and adding to Cadd.

There are two important parameters that can easily be adapted to. One is the power supply voltage which is important only during seek and the other is G1 (or G2) which is important for both seek and track follow.

The power supply voltage is measured by an A/D converter built into the processor chip. This is read during a recalibrate procedure and used to modify the profile. Tests with the Dynamic Simulation Language (DSL) program used to generate the profile, showed that for a 1% change in the 24 volt power supply, there is approximately a 4% change in the profile velocity for a given distance to the target track. Each sector during the seek, the servo processor can modify the profile velocity based upon what it has measured the power supply to be. The power supply voltage does not affect the track follow mode.

The parameter G1 is slightly more-difficult to measure. It requires that a special seek be executed so that measurements may be taken during the acceleration phase of the seek. During that time, a nonsaturating drive must be applied to the coil driver so that the coil current is known. The position is then measured during each sector of the acceleration. The following equation is then used for each measurement and the results are averaged:

$$G1 = \frac{x1(k+1) - (2)x1(k) + x1(k-1)}{u(k) + u(k-1)} \quad (10)$$

This equation can be derived using equations (1) and (2) and assuming $x3(k)=0$. G1 is calculated once for an inbound seek and once for an outbound seek and then averaged together. This eliminates any effect of bias. Once G1 is calculated, it can be used to modify the profile and the Ks from the track follow output equation to adapt to the changes in G1 and G2 (G1=G2/2). Using the same techniques as with changes in the power supply voltage, it was determined that a 1% change in G1 resulted in a 0.5% change in the profile velocity. For track following, a 1% increase in G1 results in a 1% decrease in all of the K's (K1, K2 and K4). This maintains the closed loop poles of the system at the design point in the track follow mode.

One other factor that affects seek, but not track follow is the coil resistance. There is little initial tolerance on this, but it varies up to 30% with temperature. It is very difficult to measure with the servo processor on-line, so enough safety is built into the curve to account for the worst case of this particular parameter.

Within the servo processor, all arithmetic is done with 16 bit precision. Thus, every time a multiply is done, it is necessary to truncate or round off the answer. The drive command u(k) also gets reduced to 8 bits from 16 since the D/A converter is only 8 bits wide. Each of these operations introduces errors when they are performed. These then get fed around in the loop and affect the performance. The basic idea is to treat the closed loop system as one which has external inputs that represent the truncation errors. This involves analyzing the system to determine the effect of the truncation errors and assign them probability distributions. Then the standard deviation of the position error which results from these truncation effects can be calculated. Results show that the resulting position error standard deviation is about 1.2 microinches. This is quite small relative to other errors in the system.

FIG. 1 illustrates a disk drive wherein the actuator assembly 10 accesses the lower two disks 11 of a four disk spindle assembly. The hub 12 has four disks mounted thereon and separated by spacers 13. The disk stack is compressively retained on the hub by a resilient element 15, collar 16 and the shrink ring 17 that is secured against the outer surface of the hub 12 by a shrink fit after assembly when heated and expanded. The hub/disk assembly is mounted on spindle shaft 18 such that the disks 11, hub 12, spindle shaft 18 and the rotor of the spindle drive motor 19 rotate in unison within the bearings 20.

The linear actuator carriage 21 moves radially inward and outward as it is driven by a voice coil wound on the bobbin 23. The voice coil reciprocates in the working air gap 24 in which a magnetic field is established by the radially polarized permanent magnets 25 and the pole pieces 26. Actuator carriage 21 is guided along the radial path by three pairs of rollers 28 (one pair of which is shown) that engage a rod or way 29 at each lateral side of the actuator carriage. Two pairs of the rollers are at one lateral side and longitudinally spaced and one pair at the other lateral side is disposed longitudinally intermediate the other two pairs. One roller of the single pair is spring biased to take up any slack between the carriage/roller assembly and the ways or rails 29.

The carriage assembly includes the body 31 which carries rollers 28; the voice coil and the transducer suspension assemblies wherein arm 33 has attached thereto a resilient suspension 34 that carries a transducer head 35. Each of the transducer coils is connected to the arm electronics module 36 on the flexible conductor 37 at the solder terminations 38. The arm electronics module 36 is connected to the remainder of the disk drive circuitry by conductors on the flat cable portion 39. There is also an internal air circulation within the head disk assembly which is induced by the impeller action of the hub 12 and the rotating disks 11. Air flow radially outward from the hub interior through apertures 41 in the spacers 13.

Figure 2:
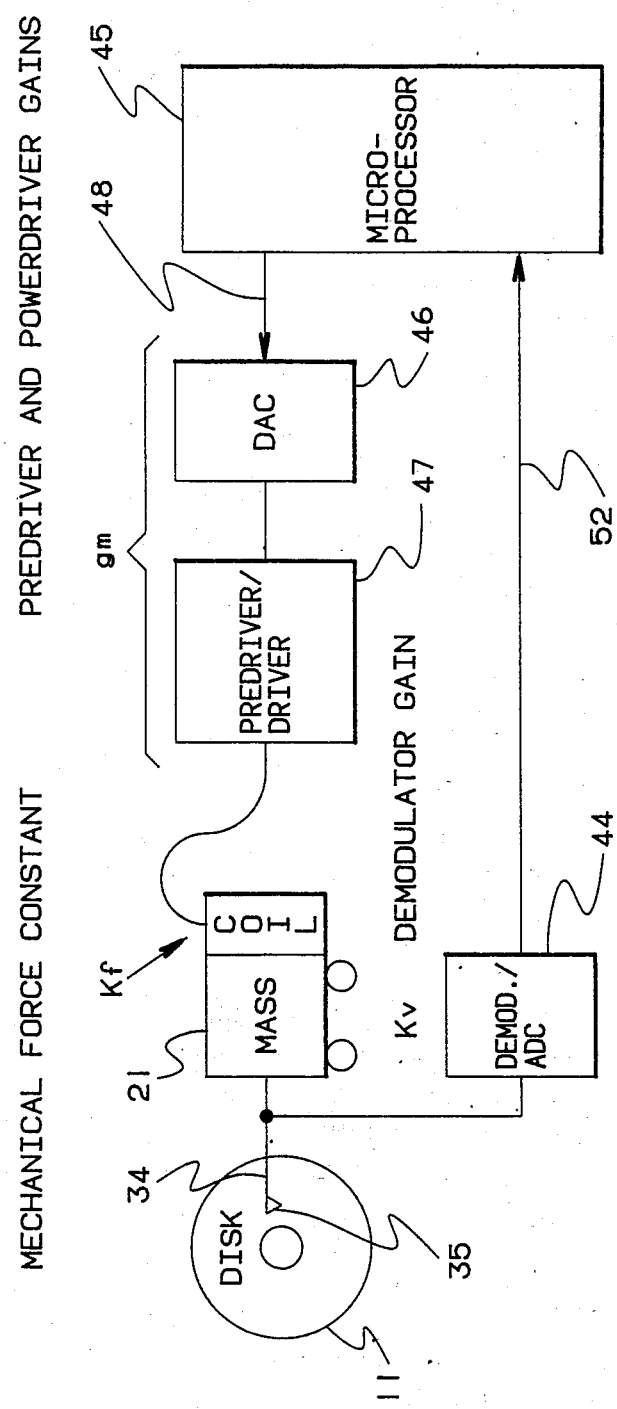
FIG. 2 is a schematic diagram illustrating the actuator carriage assembly, cooperating disk, microprocessor and circuits involved in accessing and track follow.

FIG. 2 is a schematic showing of the actuator system which also indicates the associated parameters that affect device control. The actuator carriage 21 and transducer suspension 34 that move in unison have a mechanical force constant Kf. Information read by the transducer head 35 from disk 11 is received by the demodulator/analog to digital converter (ADC) circuitry 44 (that possesses a demodulator gain, Kv) and digital information is sent to the microprocessor 45. Microprocessor 45 controls the current transmitted to the actuator voice coil. The digital to analog converter (DAC) 46 and predriver/driver circuitry 47 have predrive/ power driver gains, gm.

Figure 3:
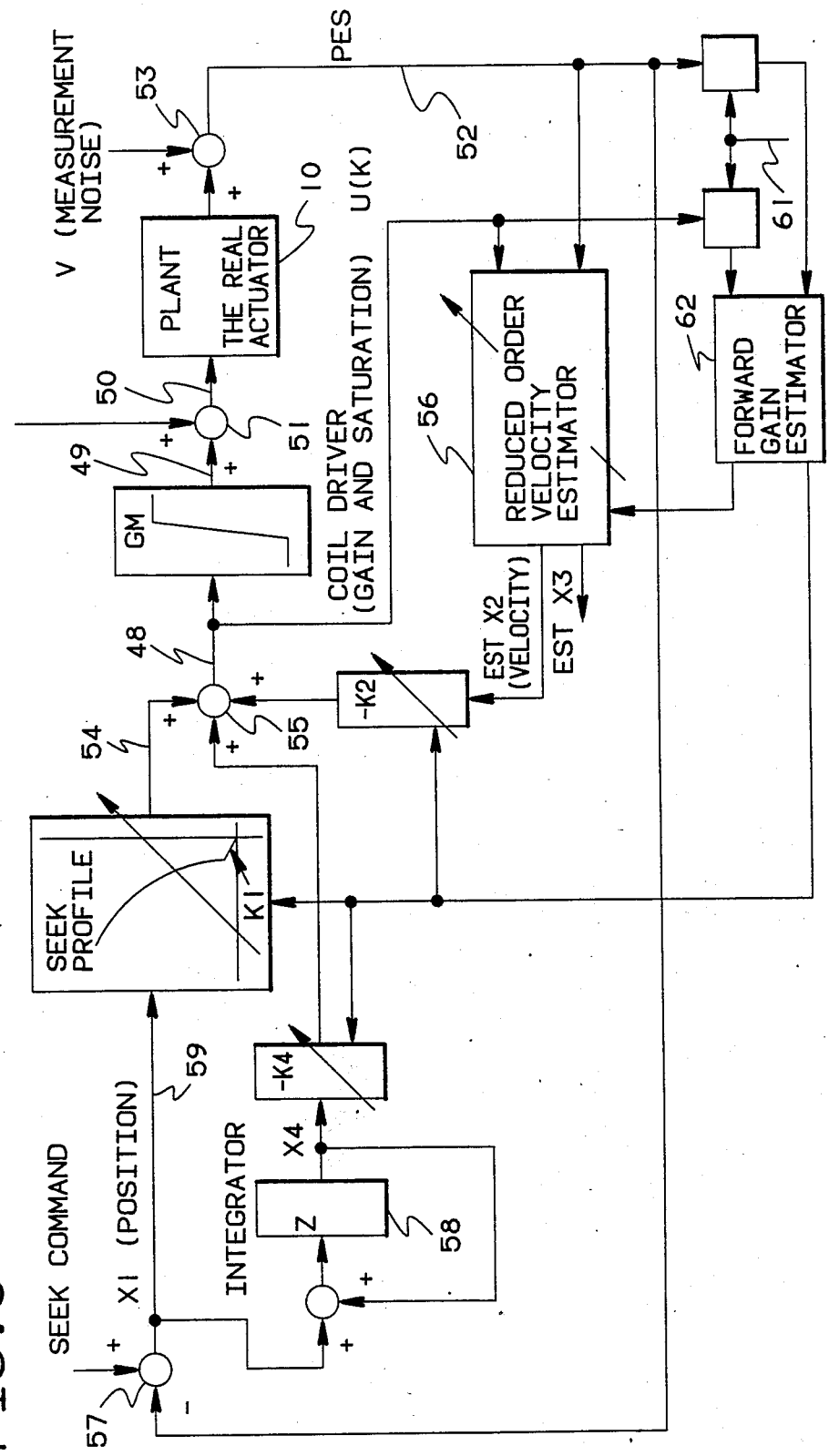
FIG. 3 is a block diagram illustrating the adaptive control technique that permits alteration of the open loop system without changing closed loop performance.

As seen in FIG. 3, the signal or command on line 48 is representative of and defines the coil current on line 49 that is supplied to the plant or disk drive actuator assembly 10 on line 50. The summing junction 51 is shown to include the process noise (w) that causes a variation in the coil current actually received by the voice coil of actuator 10. The process noise includes resonances, parameter uncertainties, unknown driver gains, bearing drags, windage and other unknowns, noise sources or imperfect knowledge that affect actuator motion. Although a factor that must be accommodated, the composite of these factors in the operating environment are small in comparison to the coil current.

The signal received from the actuator on line 52 is the position signal derived from the servo information written on the disk surface. This position error signal (PES) that is representative of a measurement of the distance the head is positioned from the centerline of one or both of the adjoining tracks. The summing junction 53 is provided in the illustration to account for the error signal measurement noise (v) which is present due to the fact that the sensors, demodulator and disks in the disk drive assembly all are sources of electrical noise that contaminates the measurement. These noise sources tend to be random which enables such errors to be overcome by ignoring readings of a sequence that are significantly divergent from a progressive pattern or obtaining a less affected value by rereading the servo information.

The PES on line 52 is transmitted from the demodulator to both velocity estimator 56 and the seek logic at summing junction 57. The seek logic, during seek mode, creates a command on line 59 in the form of a number of tracks to go during the seek. The length of seek is used to obtain a velocity profile from the memory. From the profile a signal is generated and transmitted on line 54. This signal is representative of the selected current level to be applied for the present position of the access sequence. The memory is a table used to generate the nonlinear profile. The signal is received at the summing junction 55. In track follow there is a constant gain, K1 from the memory. In the illustrated embodiment, the handoff from seek mode to track follow mode occurs when the actuator is less than a quarter track from the target track.

The velocity estimator 56, knowing the actuator/driver parameters, that is actuator force constant (Kf), mass (m) and predrive/power driver gains (gm), constructs a mathematical model. By applying the known coil current from line 48 and the PES from line 52 it is possible to obtain good estimates of velocity (estimated x2) and bias (estimated x3). The bias is a constant offset in force due to such factors as windage and file tilt. The estimated bias is used internally within the estimator to correct the velocity estimate. The estimated velocity is multiplied by constant K2 and supplied to the summing junction 55.

Integrator 58 provides an integrated position signal which is used in the track follow mode, but turned off during seek operations. The integrator output is the running sum of position x1 which is multiplied by constant K4 and applied at the summing junction 55.

In seek mode the microprocessor 45 combines position and estimated velocity signals to generate the signal on line 48 which indicates the magnitude of coil current (equation 8). In track follow mode (equation 7), the microprocessor combines position, integrated position, and estimated velocity signals to produce a composite signal which represents the current magnitude to be applied to the actuator voice coil.

The adaptation is done during recalibrate mode. In recalibrate mode a signal on line 61 gates the coil current signal (line 48) and the PES (line 52) to the forward gain estimator 62. During this mode two special seeks are made, one outbound and one inbound and the data used to calibrate both G1 and G2. By calculating the gain in both directions of actuator travel the effects of bias are cancelled when the gains are averaged. The output of forward gain estimator 62 is used to modify K1, K2 and K4 and velocity estimator 56. The calibration occurs once at device power up and thereafter when required by certain errors or error combinations. Although infrequent, such corrections are adequate since the underlying properties that affect G1 vary slowly over time.

What is claimed is:

1. A rotating storage device having data stored thereon in parallel tracks comprising
   transducer means;
   an actuator assembly which includes a voice coil and is connected to said transducer means for moving said transducer means from one track location to another track location;
   controller means, having an on-line adjustable gain characteristic, for controlling movement of said actuator assembly;
   estimator means, having an on-line adjustable gain characteristic, for estimating actuator velocity and bias;
   means for estimating the forward gain of said actuator assembly from position and coil current measurements;
   means for comparing said estimated value of forward gain with a nominal value of forward gain to generate an error signal; and
   means to adjust said controller means and estimator means gain characteristics as a function of said error signal.

2. The rotating storage device of claim 1 wherein said forward gain estimating means is active during a constant acceleration portion of actuator assembly access operation.

3. The rotating storage device of claim 2 wherein said means for estimating forward gain functions to estimate forward gain during a constant acceleration access in one direction, then functions to estimate forward gain during a constant acceleration access in the opposite of said one direction and averages the two estimated gains to cancel the effects of bias forces.

4. The rotating storage device of claim 2 further comprising
   power supply means for delivering a first level of current to said actuator assembly voice coil to effect acceleration of said actuator assembly during operation of said device; and
   wherein, when said velocity estimating means is operative, said actuator assembly is supplied a current level that is less than said first current level to prevent current saturation in said actuator assembly voice coil.

5. The rotating storage device of claim 2 wherein said controller means, functioning during track follow mode comprises a plurality of corrective constant values which are adjusted or recalibrated by said adjustment means.

6. The rotating storage device of claim 2 wherein said controller means, functioning during access mode comprises a constant applied to adjust said coil current and said adjustment means may change the value of said constant in response to said error signal generated by said comparing means.

7. A substantially frictionless system having a movable assembly driven from one position to another position by the application of an electric current and including a microprocessor comprising controller means, having an on-line adjustable gain characteristic, for controlling movement of said assembly;

estimator means, having an on-line adjustable gain characteristic, for estimating assembly velocity and bias;

means for estimating forward gain of said assembly from position and current measurements;

means for comparing said estimated value of forward gain with a nominal value of forward gain to generate an error signal; and means to adjust said controller means and said estimator means gain characteristics as a function of said error signal.

8. The system of claim 7 wherein, when said assembly is moving from one position to another position, said forward gain estimating means is active during a constant acceleration portion of the cycle of motion of said assembly.

9. The system of claim 7 wherein said means for estimating forward gain functions to estimate forward gain during a constant acceleration motion in one direction, then functions to estimate forward gain during a constant acceleration motion in the opposite of said one direction and averages the two estimated gains to cancel the effects of bias forces.

10. A rotating storage device having data stored thereon in parallel tracks comprising an actuator assembly having a transducer mounted thereon for movement in unison to move said transducer from one track location to another track location, said actuator assembly having an input signal which is a function of coil current and an output that provides a position error signal (PES);

controller means, having an on-line adjustable gain characteristic, for controlling movement of said actuator assembly and estimating actuator velocity;

means for estimating the forward gain of said actuator assembly from the PES and coil current signal;

means for comparing said estimated value of forward gain with a nominal value of forward gain to generate a gain error signal; and means to adjust said controller means gain characteristics and estimator means as a function of said gain error signal.

11. The rotating storage device of claim 10 wherein said forward gain estimating means is active during a constant acceleration portion of the motion of said actuator assembly.

12. The rotating storage device of claim 11 wherein said means for estimating forward gain functions to estimate forward gain during motion in one direction, then functions to estimate forward gain during motion in the direction opposite of said one direction and averages the the two estimated gains to produce an estimated forward gain value unaffected by bias forces.

* * * * *